May 12, 1970  R. T. KEATING  3,511,971
TEMPERATURE CONTROL
Filed Aug. 24, 1967  2 Sheets-Sheet 1
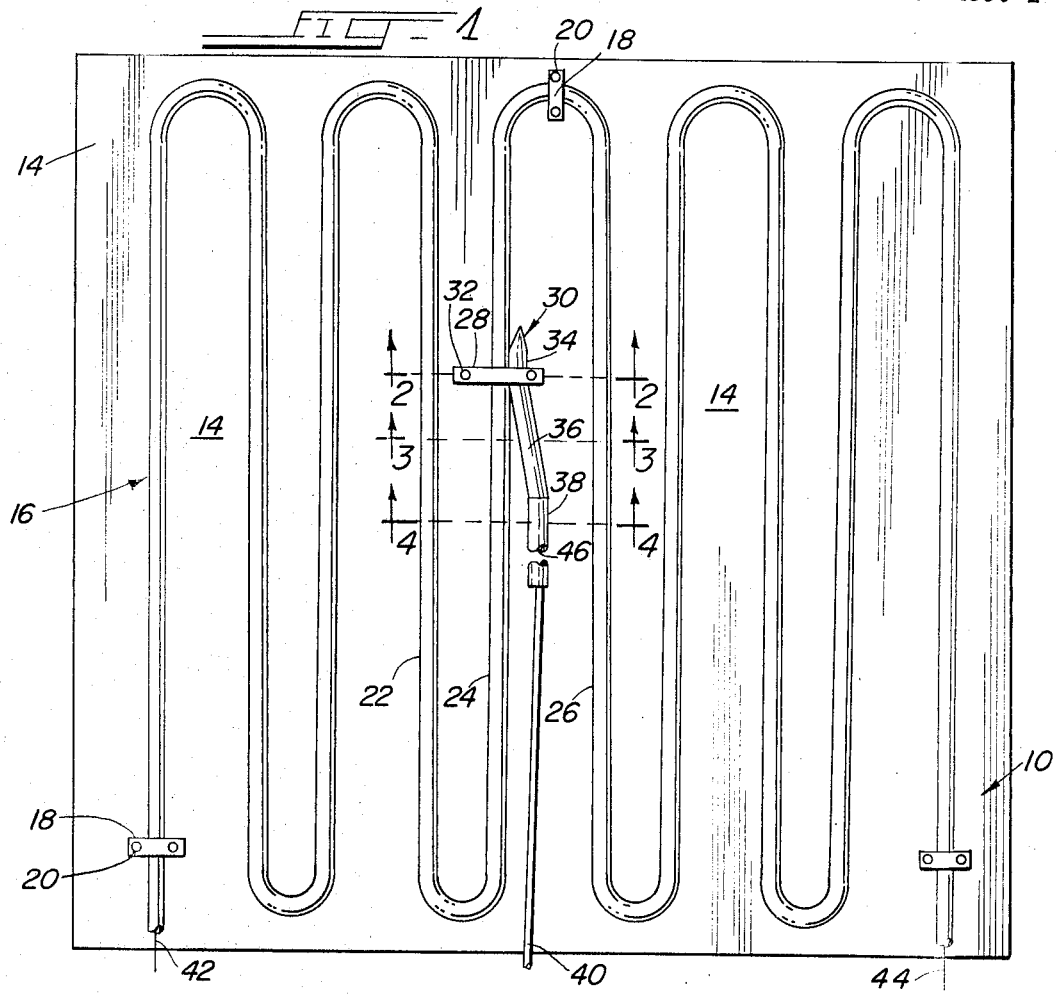
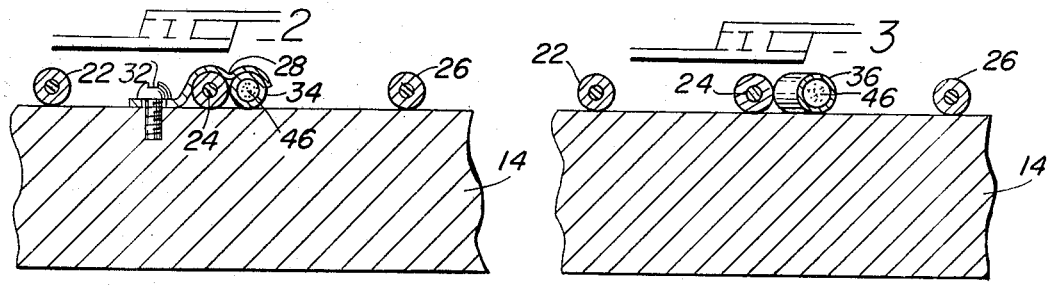
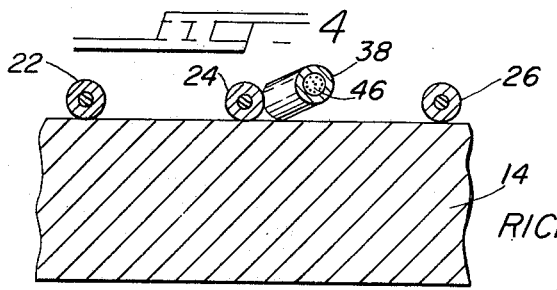
INVENTOR.
RICHARD T. KEATING
BY Rummler & Snow
ATTYS.

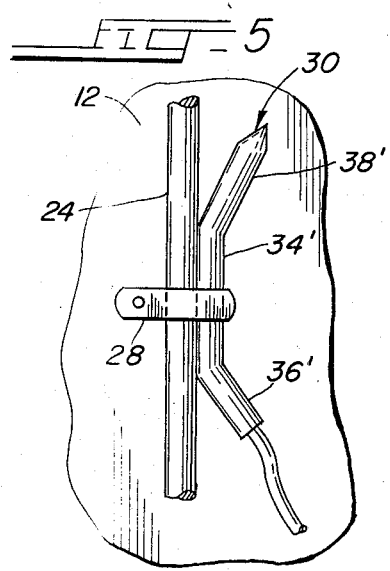
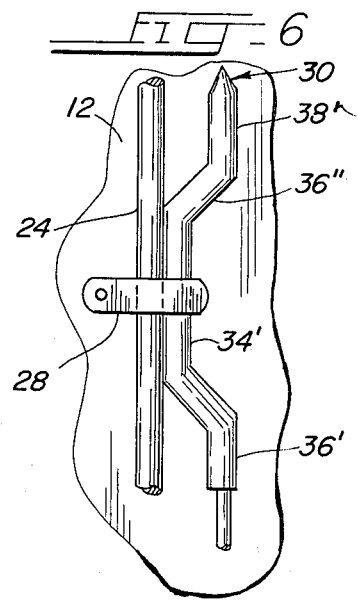
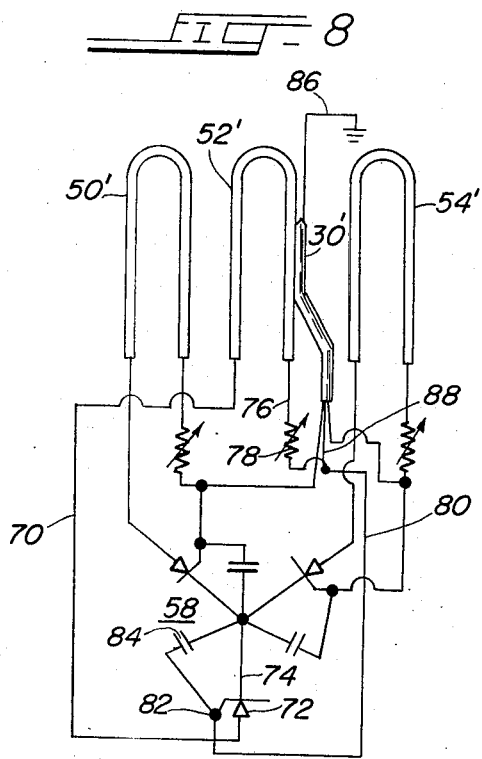
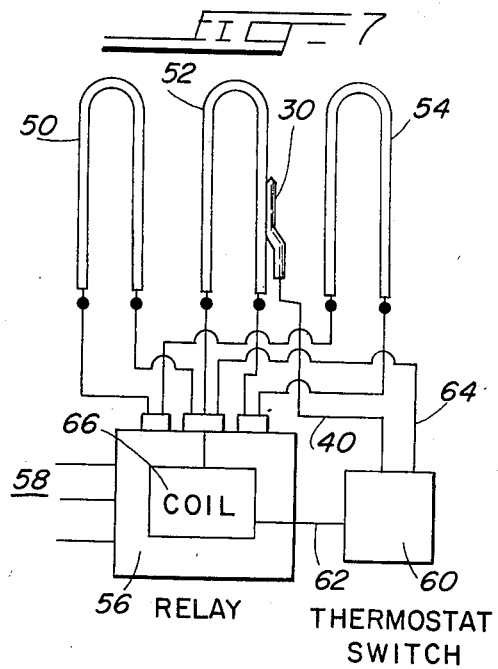

United States Patent Office 3,511,971
Patented May 12, 1970

3,511,971
TEMPERATURE CONTROL
Richard T. Keating, 4301 W. Madison St.,
Chicago, Ill. 60624
Filed Aug. 24, 1967, Ser. No. 662,940
Int. Cl. H05b 3/68
U.S. Cl. 219—449                    9 Claims

ABSTRACT OF THE DISCLOSURE

A temperature control system is disclosed having a heat responsive element positioned in relation to the heat source and heat radiating means such that a portion of the heat responsive element is in contact with both the heat source and the heat radiating means, a portion is in contact with the heat radiating means and a portion is in contact with the atmospheric environment in the vicinity of the heat source and heat radiating means. In one embodiment the control system is shown in relation to a grill plate. Other embodiments are disclosed.

BACKGROUND OF THE INVENTION

The thermostatic control of the temperatures of rooms, ovens, fryers or heated enclosures is commonly practiced. However, there is a continuing problem of maintaining accurate and constant temperatures in high heat input devices such as hot plates, space heaters, metal treating furnaces, reactors and the like. It is relatively simple to maintain a room or oven at a fairly constant temperature range of only a few degrees where low heat input sources are employed, yet in devices such as electric grills, hot plates, and such devices where accurate control of surface temperature is desired, it has been very difficult to maintain temperatures within less than 20 to 35 degrees of a desired temperature, even when using the most accurate and expensive thermostatic controls.

One of the most critical areas where accurate heat control is required is in chemical reactions such as the cooking of food which has very well defined optimum temperatures for proper treatment. Another critical area of heat treatment is in electric furnaces i.e., those used in metallurgy and conduction of liquid and gas phase reactors of various kinds used by chemists. In these heating processes it is important to reduce and control the range of temperature variation particularly where the desired reaction or physical change occurs at a critical or optimum temperature. Hot plates used in restaurants are a prime example wherein it is virtually important to reduce the range of temperature variation for proper food preparation. Temperatures under the optimum impose long cooking times and result in excessive extraction of fats from the food being cooked. Temperatures above the optimum cause over-cooking of the outer surfaces of the food, leave the inner portions uncooked and result in rapid chemical breakdown or charring of both the food and any cooking oil or grease in contact with or in the food.

Conventional thermostats which provide substantially accurate temperature control at low rates of heat input, i.e., 4 to 10 degrees temperature rise per minute, are not accurate at high rates of heat input where the heat input is such as to produce a temperature change of 40 to 60 degrees F. or more per minute. The reason is that at the low rates of temperature change, the thermostat has time to sense the change and the fluid in the sensing element has time to expand, or contract as the case may be, to provide a reasonably good control. With a system of high-heat input, however, where the temperature changes at a rate of 40 to 60 degrees F. per minute, the temperature is changing so rapidly that, by the time the thermostat sensing element reacts to the change, the temperature of the body being controlled has already overshot its mark, and even though the thermostat shut-off at 350° F., for example, the body will have reached 365° to 375° F.

The same thing happens during the "off" side of the control cycle. The grill body or fryer cools relatively slowly when it is idling, but when it is actively cooking food, giving up its heat rapidly, the temperature drop is very rapid. For example, a deep-fat fryer or a griddle can cool 100° from 375° F. in just one minute and by the time the thermostat has responded to this cooling effect, the temperature has dropped far below the temperature which the thermostat senses. Thus the important consideration for the control of high heat input systems is the rate of change of temperature.

In my U.S. Pat., 2,846,147 there is disclosed a narrow range thermostat for deep fryers using a gas-fired flame tube to heat the cooking fat in which the food is immersed. The thermostatic element or bulb is positioned to sense the heat of the heating medium (the flame) and the material being heated (the cooking fat). The bulb is bent so as to have a portion of the bulb in direct surface-to-surface contact with the heating element, or heat transfer surface, while the remainder of the bulb is submerged in the fluid (fat) being heated, but is spaced from the primary heating surface. By these means the temperature of the cooking oil is maintained within a range of 2° F. of the desired temperature, even with temperature change rates of 40, 50 or 60 degrees F. per minute.

The problem with which the present invention is concerned, however, is to provide a similar, accurate, narrow range control means for a high-heat input system wherein the temperature to be regulated is the surface or body temperature of a heat conducting and radiating device, such as a cooking and frying grill plate, which is directly influenced by the heating means and the ambient atmosphere.

SUMMARY OF THE INVENTION

In accordance with this invention accurate body temperature control of heat conducting and radiating means heated by high input devices is attained by positioning the heat responsive element or bulb such that one portion of the element is in direct surface-to-surface contact with both the heat source and the heat radiating means, a second portion is in direct surface-to-surface contact with only the radiating means, and a third portion is in contact with only the atmospheric environment in the vicinity of the heat source and heat radiating means. By these means the accuracy of the temperature control is maintained to within 2 to 3° of the desired temperature in high input heating devices such as furnaces, chemical reactors, electric grills, hot plates and the like.

As will be more thoroughly described in relation to the preferred embodiments of this invention, the foregoing temperature control is attained by providing the heat responsive element, such as a commercial tubular type thermostat bulb or an electrical resistance in such linear form that any combination or sequence of portions thereof are in contact with the heating source and the heat radiating means, the heat radiating means alone and finally in contact with only the air environment of the heating source and the heat radiating means.

In a hot plate the heat source is the resistance coil, the heat radiating means is the hot plate on which the food is being cooked.

A feature of this invention is that by varying the length of each portion of the heat responsive element or thermostat bulb in contact with each of the foregoing parts and environment, the control rage or sensitivity can be adjusted. Also the segments of the heat responsive element and thermostat bulb, so positioned, do not need to be sequential or in the order named. For sensitivities in the order of 2 to 3° with a grill plate of commercial restaurant size the shortest segment of the bulb will be against both the heating element and the grill and the segments against the grill plate only and in contact with the environment only may be approximately the same length. For instance, the segment against the heating element and grill can be 2 units in length and the remaining segments 5 to 7 units each in length. In a preferred embodiment the segment against both the heating element and grill is about 3 units log, the segment against the grill alone is about 5 units long and the segment which is in contact with neither or is in the air is about 7 units long. These same relationships of segment lengths will apply to other heating devices.

DESCRIPTION OF THE DRAWINGS

The specific embodiments of this invention are shown in the accompanying drawings in which:

FIG. 1 is a bottom plan view of a grill plate showing the looped heating element and one arrangement of the thermostat control;

FIG. 2 is a partial cross-sectional view taken along lines 2—2 of FIG. 1;

FIG. 3 is a partial cross-sectional view taken along lines 3—3 of FIG. 1;

FIG. 4 is a partial cross-sectional view taken along lines 4—4 of FIG. 1;

FIG. 5 is a partial bottom plan view of the bottom of a grill plate showing another embodiment of the thermostat control of this invention;

FIG. 6 is a partial plan view of the bottom of a grill plate showing still another embodiment of this invention;

FIG. 7 is a diagrammatic view of one form of the electric circuit used to control the grill plate and thermostat of this invention; and FIG. 8 is a similar view showing an arrangement using a thermistor and triac control for the heating means.

THE PREFERRED EMBODIMENT

Referring to the drawings, particularly FIG. 1, there is shown a grill plate of conventional design having a smooth flat grill surface 12 (see FIGS. 2, 3 and 4) which would normally be in the upright position for use as the cooking surface, for instance in the grilling of meat and the like. Attached to the bottom surface 14 of the grill plate 10 is an elongated heating element 16, of the electrical resistance type, formed into loops for even heat distribution. One or more U-brackets 18, held to the plate 10 by means of suitable bolts or machine screws 20, are used to attach the heating element to the plate. Other means of attaching the heating element 16 to the bottom 14 of the grill plate can be used.

The heating element 16 can be otherwise arranged on the surface 14 in a manner to effect efficient heat transfer thereto as is known to this art. In the embodiment shown the heating element 16 has a number of reverse loops and straight sections, such as 22, 24 and 26, extending transversely across one dimension of the grill plate. One of these sections 24 has a bracket 28 thereacross, supporting thermostat sensing bulb 30, and held by means of bolt 32. The thermostat bulb 30 is shown in three segments indicated at 34, 36 and 38, the latter communicating with the capillary tube 40. The lead wires for the heating element 16 are shown at 42 and 44.

The thermostat bulb 30 is shaped or bent so that the segments 34 and 36 are in a common plane coincident with and in contact with the plane surface 14 of the bottom of the grill plate 10 and the segment 38 is bent upwardly out of the plane of this surface. By this arrangement the bracket 28 holds the segment 34 in contact with both the section 24 of the heating element and the surface 14 of the grill plate 10. This is clearly shown in FIG. 2.

Referring to FIG. 3 the segment 36 of the thermostat bulb 30 is spaced from the sidewall of the segment 24 of the heating element and still in contact with the surface 14. In FIG. 4 the segment 38 of the thermostat bulb is shown in a raised position wherein it is in contact with the air environment only under the grill plate. In the embodiment thus far described the segment 34 is the shorter and can measure about ⅕ the total length of the bulb 30. The segment 36 is of intermediate length and can measure about ⅓ the total length of the bulb 30; while the segment 38 is the longer and can measure about 7/15 to ½ the total length of the bulb 30. Thus with a bulb 30 which is 15 inches long, the segment 34 can measure about 3 inches in length, the segment 36 can measure about 5 inches in length and the segment 38 can measure about 7 inches in length, in accordance with one embodiment of this invention.

These dimensions are not critical and various combinations of lengths can be used. Variations in these lengths and the relationship of their lengths to the total bulb length are contemplated by this invention and can be used to impart the desired control range and sensitivity to the thermostat bulb.

The thermostat bulb 30 is filled with a suitable liquid having a finite volumetric change within the heating range or temperature range of the grill. The liquid in each segment is in open communication with the next adjacent segment, that is, as shown in FIG. 1, the bore 46 of the bulb 30 containing same extends uniformly through the length of the bulb. The liquid in each segment exerts a partial pressure therein and the summation of these pressures is exerted through the capillary tube 40 to operate a bellows or other pressure responsive means to control the heat input. The resultant pressure in tube 40 is the sum of the increments of partial pressure changes. Each increment of pressure change from the individual segments is a function of the volume of liquid subjected to heat therein. The volume in turn is controlled by the length of each segment and the resultant incremental change in pressure is in turn a function of the temperature change to which that segment is subjected.

The segment 34, in contact with both the heating element 16 and the heated plate 10 is subjected to greatest fluctuations in temperature and if it alone were controlling, would cause the thermostat to shut off a short time before it should during periods of heat input. As the temperature of the heavy grill plate raises, the temperature of the segment 36 lags behind that of the segment 34 contacting both heating element and the grill plate 10 so the partial pressure in the segment 36 is less than that of the segment 34. The overall pressure increment from these two sources is therefore less than if both segments 34 and 36 were positioned as 34. Similiarly, the segment 38, in contact with the air environment only, exerts a further off-set in that its partial pressure will be less, or increase at a slower rate, than that in the segments 34 and 36. The resultant total pressure change will be intermediate and the current to the heating element will be shut off just before the grill plate has reached the desired or set temperature. The heat remaining in the heating element will bring the plate to the desired temperature, after shut-off.

With the current shut off, the temperature of the relatively heavy grill plate will gradually fall, but the segment 38 and also the segment 36 will sense this change before the segment 34. The negative increment of pressure will therefore cause the thermostat to call for heat before the temperature of the plate has fallen to the allowable minimum temperature. This means that the temperature curve will be maintained at nearly a constant value with little or no fluctuations and no "hunting" or "cycling" of the thermostat during either the heating period or the cooling period.

Referring to FIG. 5, the relative positions of the segments of the bulb 30 have been changed. The segment 38' extends into the environment surrounding the underside 12 of the grill plate, while the segment 34' is in contact with both the heating element 24 and the underside 12 of the grill. And lastly the segment 36' is in contact with the back side of the grill plate only. Conversely, the embodiment shown in FIG. 5 can be fabricated by proper choice or bending of the thermostat bulb 30, so that the segment 38' is in contact with the plate surface 12, the segment 34' is in contact with both the heating element 24 and the plate surface 12 and the segment 34' is in contact with both the heating element 24 and the plate surface 12 and the segment 36' is in contact with the air only.

In FIG. 6 still another arrangement is shown in which the segment 38' of the thermostat bulb 30 is in a raised position so that it is in contact with the air only, the segments 36" and 36' are in contact with the plate surface 12 and the segment 34' is in contact with both the plate 12 and the heating element 24. In this arrangement the length of the segments 36" and 36' are such that their total length bears the same relationship to the total length of the thermostat bulb 30 as the herein prescribed ratio for the segment 36 in FIG. 1. In other words, the two segments 36" and 36' are considered as of the same effect as the one segment 36. Other arrangements would be obvious to one skilled in the art. It is also contemplated that the segments 38 or 38' (in air only) can be between the segments 36 and 34, but this would require an offset or half loop in the bulb. By placing the segments 38 and 38' at either end of the thermostat bulb 30, a more simple structure is made possible and the bulb is protected by the loops of the heating element.

FIG. 7 illustrates diagrammatically one form of the electrical circuit that can be used in the control of heating elements of a grill or reactor using this invention. In this embodiment three coils of the heating element are illustrated at 50, 52 and 54, the leads of which are connected to the relay 56 which is in turn connected to the 3-phase current supply 58 in a manner known to the art. The thermostat bulb 30 is shown positioned in accordance with this invention adjacent one part of the heating element 52 and the capillary 40 therefrom connects to a bellows within the thermostat switch 60 which through the leads 62 and 64 controls the coil 66 of the relay. The integrated pressure sensed by the bulb 30 operates the thermostat switch 60, to actuate the coil 66 and operate the relay 56 to open or closed positions.

FIG. 8 shows an electrical circuit employing a thermistor 30', in place of a thermostat bulb, positioned in relation to the heat source, represented by the heating element 52', in the same manner as previously described. The heating element 52' is connected by means of the lead 70 to a Triac 72 and the lead 74 to one pole of the 3 phase power upply 58. The other lead 76 from the heating element 52' is connected to the rheostat (variable resistance) 78 and through the lead 80 back to the second pole 82 of the Triac 72. A condenser 84 by-passes the Triac to the grounded pole of the power supply. The common ends of the three wire thermistor 30' are grounded through the lead 86 and one of the resistors is connected by means of the lead 88 to the lead 80. Each of the other heating elements 50' and 54' is similarly connected through a Triac to the 3-phase source 58. The thermistor resistances have a high coefficient of resistance with temperature change and each of the rheostats has a shut-off position. By these means finite control of the heating elements 50', 52' and 54' is accomplished without dependence on a thermostat bulb or thermostat switch. In this embodiment the electrical resistance characteristics of each of the thermistors within the tube 30' can be made to accomplish the same results as a thermostat tube.

Although one or more specific embodiments of this invention have been herein shown and described, it will be understood that the details of construction and operation shown can be altered or omitted without departing from the spirit of the invention as defined by the appended claims.

What is claimed is:

1. A heating device including a heat source and heat radiating means heated by the heat source, a thermostatic control therefor comprising an elongated temperature responsive body having a portion of its length in simultaneous contact with both said heat source and heat radiating means and another at least equal portion of its length in contact with only the ambient environment of both said heat source and said heat radiating means.

2. A heating device in accordance with claim 1 in which said thermostatic control comprises an elongated thermostat bulb containing an expansible fluid.

3. A heating device in accordance with claim 1 in which said heat source is a resistance heating element affixed to one side of a grill plate which serves as the heat radiatig means, and said elongated body comprises three interconnected segments of its overall length two of which have their longitudinal axes at an angle to each other in a common plane and a third segment having its longitudinal axis at an angle with and out of the plane of the axes of said first two segments.

4. A heating device in accordance with claim 1 in which the portion of said control body in simultaneous contact with both said heat source and said heat radiating means is the shortest portion of said body.

5. A heating device in accordance with claim 1 in which said portion in simultaneous contact with both said heat source and said heat radiating means constitutes about ⅓ the total length of said elongated body and the portion contacted only by the ambient environment of the heat source and radiating means constitutes about ½ the remaining length of said body.

6. A heating device in accordance with claim 1 in which said portion in simultaneous contact with both said heat source and said heat radiating means constitutes about ⅓ the total length of said elongated body, and another portion of said body contacts with said heat radiating means apart from the heat source and constitutes about ⅓ the total length of said elongated body.

7. A grill in accordance with claim 3 in which said elongated body is about 15 units long and said portion in contact with both said heat source and said heat radiating means is about 3 units long, and the remaining portions are about 5 and 7 units long respectively.

8. In a girll plate including a heating element thereagainst, a thermostat for controlling said heating element and having an elongated heat sensitive body, a portion of the length of said body being in simultaneous surface contact with both said grill plate and said heating element, another portion of the length of said body being in surface contact with said grill plate alone and the remainder of said body being contacted only by the ambient environment surrounding said grill plate and said heating element.

9. In a grill according to claim 8 comprising a substantially flat plate with a heating element of high thermal input mounted in contact with one side of said plate, a thermostat for controlling said heating element and having an elongated tubular body bent at least twice intermediate its ends, with one end portion of said body offset from the plane of the remainder of the body, one portion of said body being positioned in direct surface-to-surface contact with both said heating element and said grill plate, another portion of said body being in surface contact with said grill plate only and the remaining portion of said body being in contact with only the ambient environment surrounding said grill plate and said heating element.

References Cited

UNITED STATES PATENTS

| | | | |
|---|---|---|---|
| 2,846,147 | 8/1958 | Keating | 236—32 |
| 1,855,707 | 4/1932 | De Langie | 337—332 |
| 3,095,498 | 6/1963 | Foster | 219—441 |
| 3,384,195 | 5/1968 | Jepson et al. | 219—513 |

BERNARD A. GILHEANY, Primary Examiner

F. E. BELL, Assistant Examiner

U.S. Cl. X.R.

337—322